Figure 1:
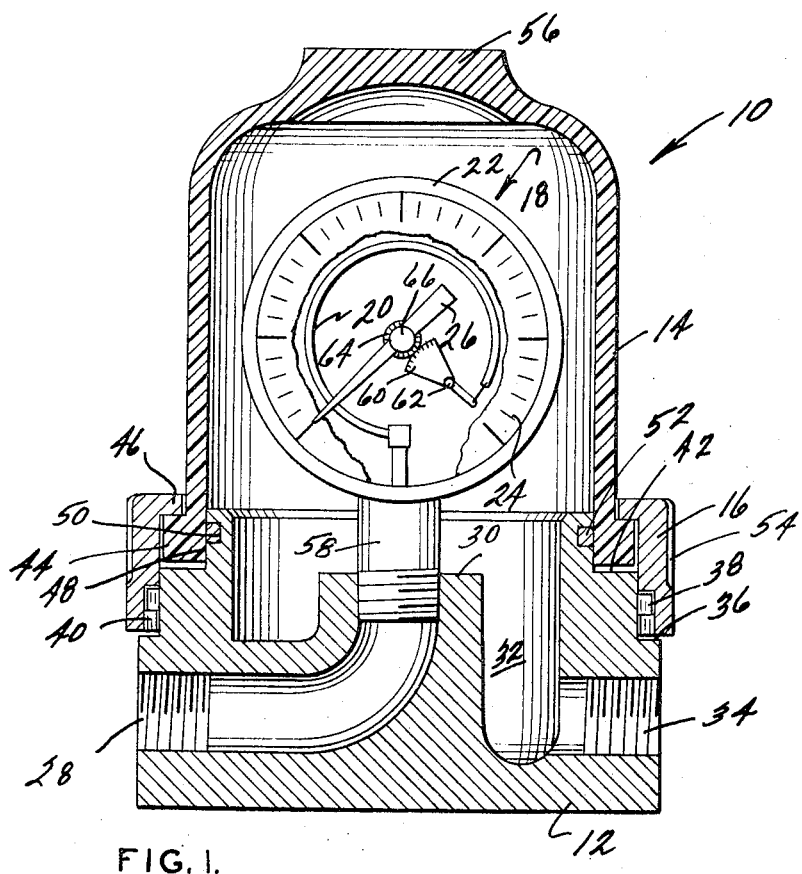

United States Patent [19]
Vander Horst

[11] 3,762,224
[45] Oct. 2, 1973

[54] DIFFERENTIAL PRESSURE GAUGE

[75] Inventor: John Vander Horst, Lakewood, Colo.

[73] Assignee: Wilkerson Corporation, Englewood, Colo.

[22] Filed: June 21, 1971

[21] Appl. No.: 155,110

[52] U.S. Cl. .................... 73/420, 73/418, 73/431
[51] Int. Cl. .......................... G01l 7/04, G01l 19/14
[58] Field of Search ................. 73/412, 411, 407, 73/418, 420, 431

[56] References Cited
UNITED STATES PATENTS

| | | | |
|---|---|---|---|
| 3,285,418 | 11/1966 | Miller | 73/431 |
| 1,403,972 | 1/1922 | Middleton | 73/407 R |
| 3,388,682 | 6/1968 | Whiting | 73/407 R |
| 3,504,551 | 4/1970 | Bohenek | 73/431 |

FOREIGN PATENTS OR APPLICATIONS
491,881  9/1938  Great Britain .................... 73/412

Primary Examiner—Richard C. Queisser
Assistant Examiner—Daniel M. Yasich
Attorney—Anderson et al.

[57] ABSTRACT

This invention relates to a differential pressure gauge in which the base has an inlet passage connectable to a source of fluid pressure and an outlet passage left open to the atmosphere. A transparent bowl is removably attached to the base by means of a lock ring. The sensing element of the gauge is connected to the inlet so as to respond to the fluid pressure therein while, at the same time, responding to the ambient conditions inside the bowl. The resulting differential pressure reading is transferred to a dial by an indicator responsive to the action of the sensing element.

5 Claims, 2 Drawing Figures

PATENTED OCT 2 1973 3,762,224

INVENTOR
JOHN VANDER HORST
BY
ATTORNEYS

DIFFERENTIAL PRESSURE GAUGE

In the average plant pneumatic system, it is important to know the differential fluid pressure as this is the working pressure available to operate the various machines, tools and other equipment serviced thereby. Differential pressure gauges, for the most part, are expensive and oftentimes difficult to install. Some differential gauges are ill-suited for use in pneumatic systems because of the ease with which they become contaminated and either stop working altogether or else give false readings.

Probably one of the most bothersome problems with the prior art differential pressure gauges is the difficulty of disassembling them to clean the dial and glass or plastic cover therefor should these elements get dirty as they often do. Fogging due to condensate formation may render a gauge useless from a practical standpoint if it cannot be read; yet, to take it off the line and disassemble it to remove the condensed moisture is both a time-consuming and difficult task which is seldom performed.

On the other hand, uncovered gauge dials provide no solution to the problem in the average industrial plant because they are too easily damaged. A bent needle may be hard to detect at a distance and the false reading it indicates can be more of a problem than no reading at all.

It has now been found in accordance with the teaching of the instant invention that these and other shortcomings of the prior art differential pressure gauges can, in large measure, be eliminated and at a fraction of the cost by means of the simple, yet unobvious expedient of removing the cover glass from an ordinary gauge and then connecting the sensing element thereof to the high pressure available within the inlet of a conventional pneumatic system drain body before covering the dial with a transparent bowl held in place by a quick-disconnect ring. The normal outlet passage in the drain body is left open to the atmosphere and the differential pressure across the sensing element is indicated directly on the face of the dial by the needle that sweeps thereacross.

The dial remains clearly visible through the transparent bowl, yet, is adequately protected by the latter. If, perchance, the dial or bowl or both become dirty or fogged, it takes but an instant to remove the clamp ring and lift the bowl free of the body so that the dial face can be wiped clean. A quick pass at the inside of the bowl removes any film of dirt, oil or moisture therefrom preparatory to locking it back in place. This complete disassembly, cleaning and reassembly operation can be performed in a few minutes time without shutting down the pneumatic system or even removing the gauge therefrom.

It is, therefore, the principal object of the present invention to provide a novel and improved differential pressure gauge.

A second object is the provision of a unit of the type aforementioned that is ideally suited for use in a pneumatic system.

Another object of the invention forming the subject matter hereof is to provide a pressure gauge that can be cleaned and serviced without disconnecting it from the line or shutting the latter down.

Still another objective is the provision of a differential pressure gauge that can be disassembled, cleaned and reassembled in a few minutes.

An additional object is to provide a pressure gauge that can be integrated quite easily, simply and inexpensively into most all industrial air systems.

Further objects are to provide a differential pressure gauge that is versatile, rugged, accurate, safe, reliable and even decorative in appearance.

Figure 2:
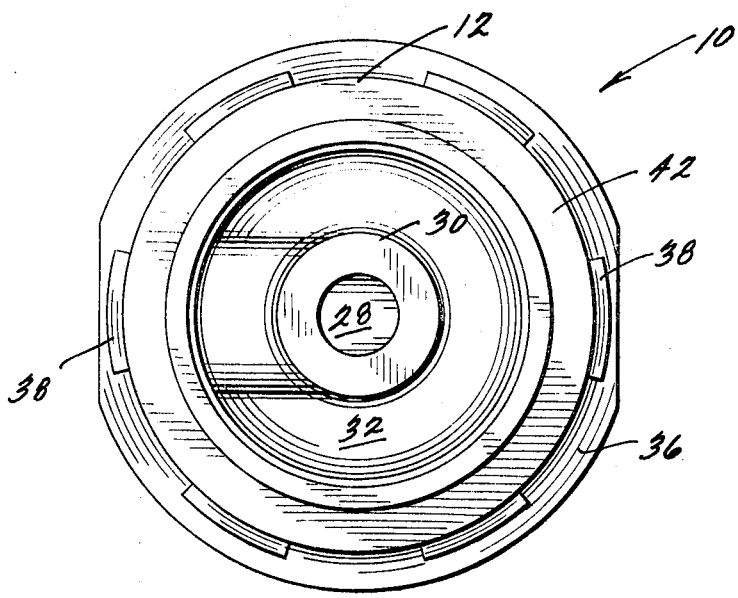

Other objects will be in part apparent and in part pointed out specifically hereinafter in connection with the description of the drawings that follows, and in which:

FIG. 1 is a diametrical section through the pressure gauge of the present invention, portions of the dial having been broken away to expose the sensing element; and, FIG. 2 is a top plan view of the body alone.

Referring next to the drawings for a detailed description of the present invention and, initially, to FIG. 1 for this purpose, reference numeral 10 has been selected to designate the differential pressure gauge in its entirety while number 12 similarly denominates the body atop which is removably attached a bowl or bubble 14 by means of a quick-disconnect lock ring 16. Mounted inside the bowl in position to be viewed therethrough is the pressure responsive mechanism which has been broadly referred to by numeral 18 and which includes a sensing element 20 contained within a housing 22 covered by a dial 24 that is swept by an indicator needle 26.

In FIGS. 1 and 2, the body 12 will be seen to comprise a casting having a fluid passage 28 that includes a right angle bend and opens upwardly into the center of the bowl. This curved passage is connected to receive air from the service line in which the differential pressure is to be measured. As will become apparent presently, no fluid passes through the body so it must be connected in a blind branch of the service line in order to not interrupt the flow therethrough. A simple T-connection will, of course, suffice for this purpose.

In the particular form shown, the body has an integrally formed upstanding central boss 30 from which passage 28 emerges and this boss is partially encircled by a trough 32 that is intersected by a second passage 34. The latter passage opens onto the exterior of the body and is left open to the atmosphere thus placing the interior of the bowl at ambient pressure.

In the embodiment illustrated, the body is provided with an upwardly facing circular ledge 36 out over which project a plurality of circumferentially spaced tongues 38. A complementary set of tongues 40 project inwardly from the lower margin of the lock ring 16 in position to pass downwardly therebetween and lock therebeneath upon limited relative rotational measurement.

A second upturned ledge 42 of lesser diameter than ledge 36 encircles the body at a higher level thereon and provides a resting place for the marginal flanges 44 bordering the bowl 14. Flange 44 is external and engages beneath the inturned annular flange 46 on the top of the lock ring 16. Thus, when the bayonet joint defined by the interlocking tongues carried by the body and lock ring is complete, the bowl is securely, though detachably, connected to the body.

In the particular form shown, the cylindrical wall surface 48 of the body 12 that lies directly above ledge 42 is provided with an annular O-ring groove 50 into which O-ring 52 is placed. This O-ring engages the inside wall of the bowl as shown and forms a fluid tight seal therewith. When the body is used as a part of the differential pressure gauge forming the subject matter hereof, the bowl will contain no fluid nor will it be pressurized; therefore, seal 52 is surplusage except for the fact that it keeps the bowl from rattling under the nearly constant vibration of the air system.

The lock ring 16 has already been described in some detail and it will suffice to point out additionally that it will ordinarily include some kind of spring latch (not shown) of conventional design that drops into place between the tongues when the latter are engaged as shown thus preventing relative rotational movement between the ring and body. Integral ribs 54 on the outside of the ring provide fingerholds that assist the operator in turning same relative to the body.

The bowl or bubble 14 is usually molded from clear transparent plastic so as to form a window through which the dial 24 can be viewed and read with minimal distortion. It should, perhaps, be mentioned that the bowl shown is designed to be viewed as illustrated or inverted so that the gauge dial will be seen through the cylindrically curved wall. In the event the unit was to be mounted so that the gauge dial would be seen from the top of the bubble, it might be preferable to redesign the bowl to provide a top wall 56 of uniform thickness to look through, all of which is well within the skill of an ordinary designer.

Again with reference to FIG. 1, the pressure-responsive mechanism will be seen to include a nipple 58 that screws into the fluid passage 28 and forms a continuation thereof that projects axially up into the bowl from the top of boss 30 where it passes into housing 22 and connects onto the sensing element 20. The housing in the particular form shown comprises a shallow cup-shaped element with the dial 24 covering the open end thereof. The sensing element 20 comprises a bourdon tube in the particular form illustrated although it may well comprise any of the several well-known mechanisms that will react quantitatively to a pair of pressures impressed thereacross such as, for example, bellow type sensors and the like. It is important in this connection that the housing 22 that encases the sensing element be left open to the atmosphere inside the bowl and that the latter, in turn, be in communication with ambient conditions outside the unit. Accordingly, the casing 22 is not sealed nor does the dial cooperate therewith to define a sealed chamber as is often the situation with this type of unit when the bourdon tube is isolated from the atmosphere and placed in a constant-pressure environment and calibrated to read absolute pressures.

The free end of the bourdon tube sensing element is linked to the usual gear segment 60 which is mounted on pivot 62 and meshes with gear 64 connected to the indicator needle 26. The needle is mounted atop a spindle 66 that pierces the center of the dial in the customary manner so that the needle will sweep the face thereof.

Now, in the event the inside of the bowl becomes dirty or fogged by condensed moisture therein, a simple twist of the lock ring will free the bowl from the body where it can be wiped clean in an instant. The same procedure is followed to clean the face of the dial. The bowl, on the other hand, adequately shields the dial face, needle and sensing element from damage. What is claimed is:

1. The differential pressure gauge which comprises: a body having an air passage therein with an inlet and an outlet; pressure responsive sensing means in a housing and connected to receive air from the air passage when the inlet of the latter is connected to a pressurized source thereof and move in relation to the pressure differential to which it is thus subjected; open faced dial means in said housing including scale indicia located adjacent the sensing means; indicator means connected to the sensing means and operative upon actuation of the latter to move relative to the dial means and indicate the differential pressure thereon; and, means comprising a transparent dome detachably connected by locking means to the body, the body and the locking means interlocked so as to define a vented chamber housing the open-faced dial means and associated indicator while providing a protective cover therefor.

2. The differential pressure gauge as set forth in claim 1 in which: the sensing means comprises a bourdon tube.

3. The differential pressure gauge as set forth in claim 1 in which: the dome comprises a molded plastic bowl with a cylindrical wall surface defining the window through which the dial is viewed.

4. The differential pressure gauge as set forth in claim 1 in which: the dome and body are detachably interconnected by a quick-disconnect bayonet-type coupling.

5. The differential pressure gauge which comprises:
a body having an air passage therein with a first air passage therein with an external inlet and an internal outlet and a second air passage with an internal inlet and an external outlet;
a pressure responsive sensing means in a housing and connected to the internal outlet of said first air passage to receive air from the first air passage when the latter is connected to a pressurized source thereof and move in relation to the pressure differential to which it is thus subjected;
means comprising a transparent dome detachably connected to the body to form a chamber for the housing of the sensing means, said dome communicating with the second air passage;
an open-faced dial means in said housing and communicating the interior of the chamber and including scale indicia located adjacent the sensing means; and,
indicator means connected to the sensing means operative upon actuation of the latter to move said indicator means relative to the dial and indicate the differential pressure between the first air passage and the interior of the chamber whereby the open-faced dial and associated indicator are contained within and protected by the transparent dome.

* * * * *